March 5, 1940.    D. A. McARTHUR ET AL    2,192,647
CONVEYER
Filed Sept. 15, 1938    3 Sheets-Sheet 1
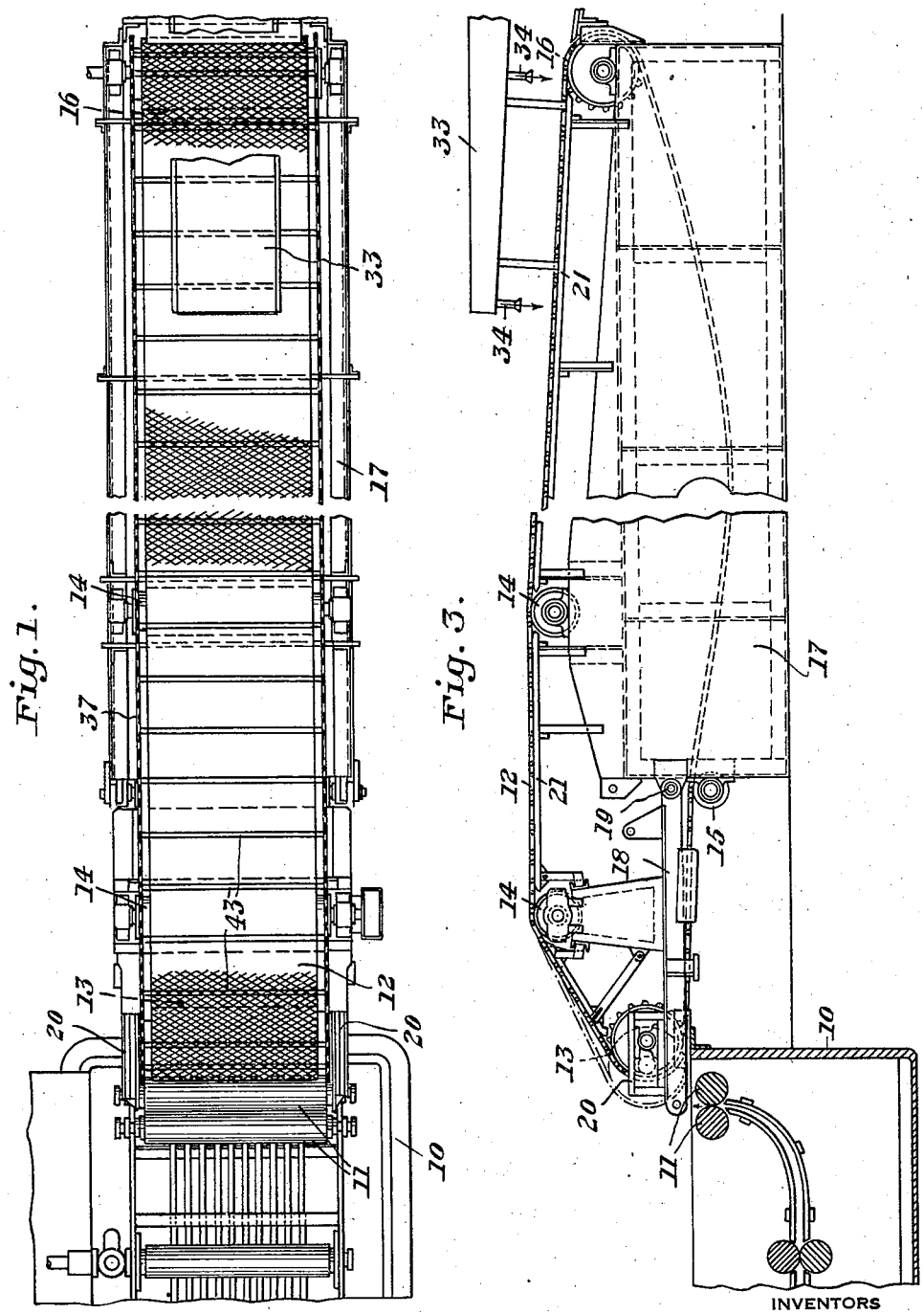
INVENTORS
Donald A. McArthur,
John C. Holdgate
and Carl Koelkebeck
by their attorneys
Stebbins, Blenko & Parmelee

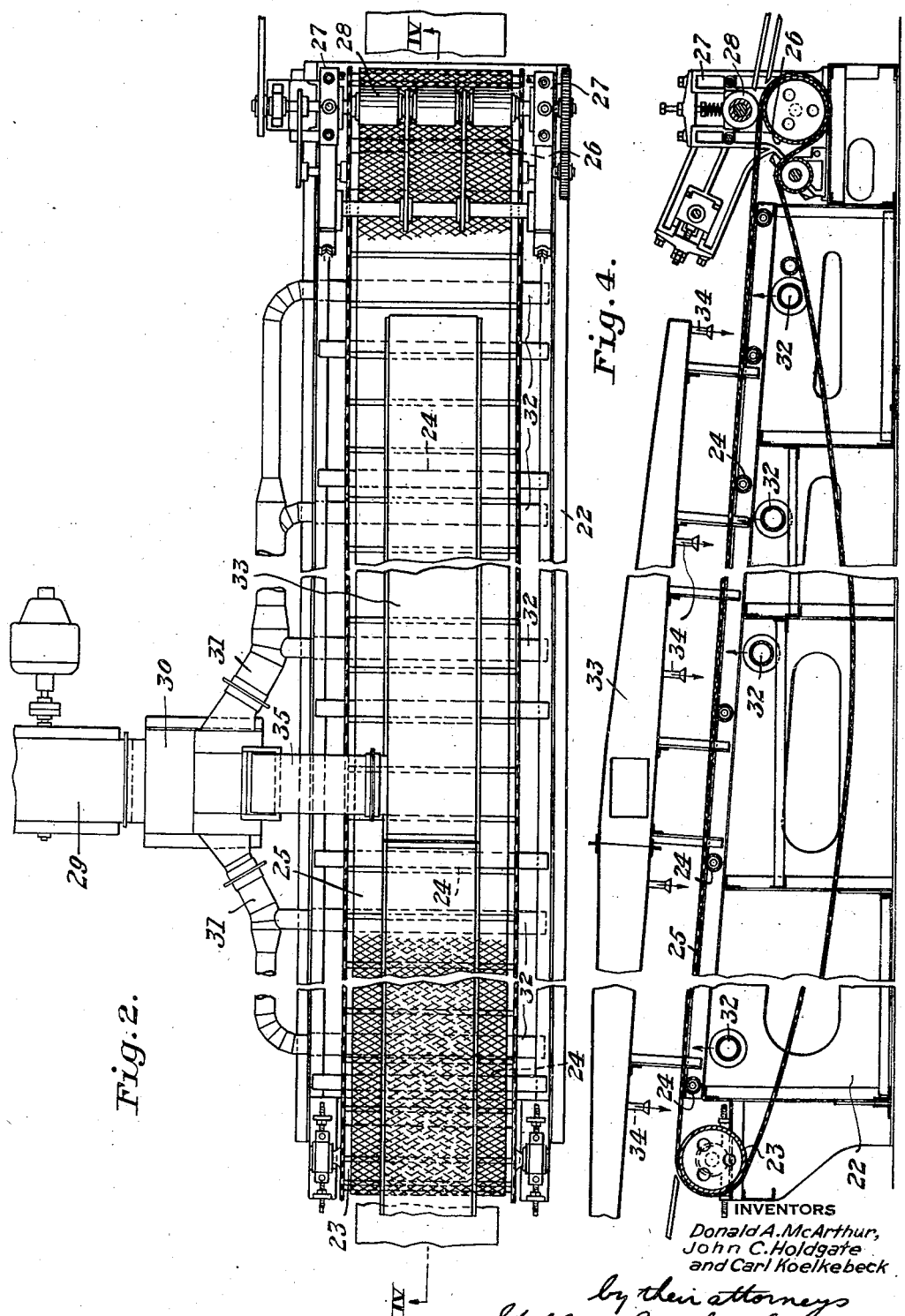

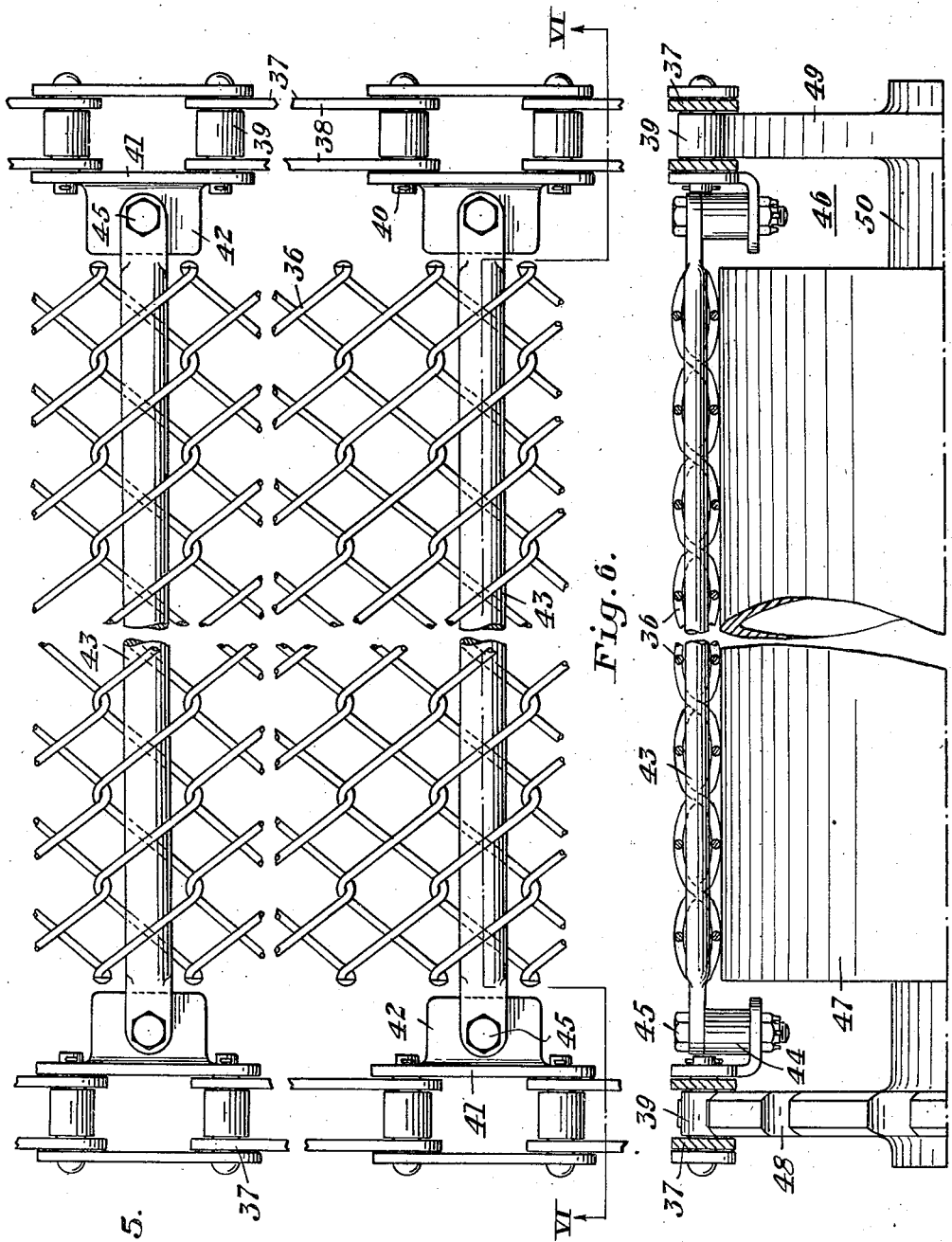

Patented Mar. 5, 1940

2,192,647

UNITED STATES PATENT OFFICE 2,192,647

CONVEYER

Donald A. McArthur, John C. Holdgate, and Carl Koelkebeck, Warren, Ohio, assignors to The Wean Engineering Company, Inc., Warren, Ohio, a corporation of Ohio Application September 15, 1938, Serial No. 230,062

2 Claims. (Cl. 91—59.8)

This invention relates in general to conveyers and, in particular, to conveyers in which the material supporting surface is constituted by an endless belt of woven mesh.

Conveyers utilizing a belt of woven mesh as the material supporting surface have numerous applications. One of these is the handling of steel sheets immediately after they have been galvanized by the hot dip process. Numerous objections to the use of such conveyers have, however, been encountered in actual practice. Considerable difficulty is experienced in causing the mesh belt to track true on the guiding and driving pulleys usually employed and the mesh has a tendency to weave back and forth from side to side. Centering devices such as guiding flanges or edge pulleys tend to break open the edges of the mesh and after the edges are worn, the mesh is quickly destroyed and the belt breaks. Mesh belts, furthermore, are subject to stretching under the tension necessary to support the conveying surface and its load, plus the driving force.

We have invented a conveyer, the material supporting surface of which is composed of a mesh belt, which is free from the aforementioned objectionable features of mesh conveyer belts as used heretofore. In accordance with the invention, we provide a material supporting mesh belt with tension supporting loops on one or both sides thereof. We have devised special means for securing the tension supporting loops and the mesh belt together whereby the mesh belt is relieved of substantially all tension and constitutes merely a material supporting surface.

The following detailed description of the invention refers to the accompanying drawings illustrating the application thereof to the handling of sheets from a hot coating bath, but this is by way of illustration only since the invention has numerous other applications as well. In the drawings:

Figs. 1 and 2 when disposed side by side with Fig. 1 on the left constitute a plan view of a system for conveying steel sheets from a galvanizing bath, including a spangle forming conveyer shown in Fig. 1 and a cooling conveyer shown in Fig. 2;

Fig. 3 is a side elevation of the apparatus shown in Fig. 1 with a portion thereof in section along a central longitudinal vertical plane;

Fig. 4 is a sectional view taken along the line IV—IV of Fig. 3;

Fig. 5 is a plan view to enlarged scale showing a portion of our conveyer apart from the supporting and guiding pulleys; and Fig. 6 is a sectional view along the line VI—VI of Fig. 5 showing also a driving pulley associated therewith.

Referring now in detail to the drawings and, for the moment to Figs. 1 through 4, a galvanizing pot 10 is provided with exit rolls 11 effective to discharge from the pot sheets passed therethrough for coating. A spangle forming conveyer 12 is trained over a magnetic pulley 13 adjacent the exit rolls 11, suitable guide pulleys 14 and 15 and a driving pulley 16. The magnetic pulley has magnetizing means incorporated therein whereby to attract magnetic articles passing thereover. The magnetic, guiding, and driving pulleys are journaled in suitable bearings supported in a frame 17 which may conveniently be assembled from structural members and plate sections. The magnetic pulley 13 and the left hand guide pulley 14 are mounted on arms 18 pivoted to the frame 17 at 19. The bearings in which the magnetic pulley is journaled are adjustable horizontally in guides 20.

The magnetic pulley 13 causes the sheets emerging from the exit rolls 11 to cling to the conveyer 12 whereby the sheets are caused to travel with the conveyer up the slope to the left hand guiding pulley 14. The detailed construction of the conveyer 12 will be described further hereinafter. Between pulleys, the conveyer is supported on tracks 21.

Figs. 2 and 4 illustrate the cooling conveyer including a frame 22 similar in construction to the frame 17 of the spangle forming conveyer. Guide pulleys 23 and 24 journaled in the frame support an endless conveyer 25 similar to the conveyer 12. The conveyer is actuated by a driving pulley 26 journaled in suitable bearings positioned in housings 27. A pressure roll 28 cooperates with the driving pulley 26 whereby sheets moving along the conveyer are forcibly discharged therefrom.

Cooling air is supplied to opposite sides of sheets passing along the conveyer 24. A blower 29 supplies air to an air chest 30. Manifolds 31 branching from the air chest feed cross pipes 32. The pipes 32 have holes spaced along the top thereof whereby jets of air are blown against the bottom of the sheets as indicated by the arrows in Fig. 4. Similarly, a duct 33 supported above the conveyer 25 and extending in part above the conveyer 12 is provided with nozzles 34 and is connected to the air chest 30 by a duct 35. By this means air jets are discharged onto the upper surface of the sheets traversing the conveyers.

Referring now to Figs. 5 and 6 for a detailed showing of the construction of the conveyers 12 and 25, it will be noted that each of them comprises a mesh belt 36. Endless, flexible, tension sustaining loops 37 parallel the belt 36, preferably on both sides thereof. In the form of the invention illustrated, these loops comprise chains having links 38 separated by spacers 39 and connected by pins 40. At intervals along the lengths of the chains 37, plain links 38 are replaced by links 41 each having a laterally extending flange 42. Cross rods or stretcher bars 43 extend through the mesh belt as shown in Fig. 6 and are secured at their ends to the flanges 42 as shown in Fig. 5. Spacer sleeves 44 support the rods above the level of the flanges 42 so that the center line of each rod is approximately in alinement with the pitch line of the chains 37. Bolts 45 extend through the ends of the cross rods, the spacer sleeves and the flanges to secure them in assembled relation.

Fig. 6 also shows the relation between the conveyer of our invention and the idler or "tail" pulley therefor. The pulley 46 includes a cylindrical portion 47 engaged by the mesh belt 36. It also includes a toothed wheel or sprocket 48 and a guiding disc 49 around which the chains 37 are trained. The conveyer is driven by pulley 26 similar to that shown at 46 except that it has a sprocket instead of the disc 49.

It will be apparent from the foregoing description that a conveyer in accordance with our invention retains all the advantages of mesh belt conveyers as used heretofore, viz., contact with the material being conveyed at spaced points only, full exposure of the material being conveyed to the atmosphere and the like. At the same time, the conveyer of our invention is free from the objectionable stretching which has been experienced heretofore. Since the chains serve as tension supporting members, the only tension to which the mesh itself is subject is that induced by the weight of the mesh section and that portion of the material being conveyed which lies between adjacent cross rods 43. The chains, furthermore, track accurately around the guide and driving pulleys and no lateral weaving of the conveyer is possible. It is unnecessary, therefore, to use guide flanges on the pulleys or edge engaging guide rollers which have a destructive effect on the mesh.

Although we have illustrated and described herein but a single preferred embodiment of the invention, it will be understood that changes in the construction and operation described may be made without departing from the spirit of the invention or the scope of the appended claims.

In the claims, the term "pulley" is to be construed as including a toothed wheel or sprocket as well as a cylindrical belt engaging wheel. The term "endless", furthermore, does not exclude belts or loops having a separable joint or joints.

We claim:

1. A conveyer adapted to receive metal sheets from a galvanizing pot, said conveyer including a pair of spaced driving chains, a belt of flexible mesh between said chains, stretcher bars extending through said mesh and secured to said chains to stiffen the belt transversely and maintain uniform contact thereof with the sheets, and a magnetic pulley adjacent an end of said pot, around which said conveyer is trained, said pulley being effective to attract sheet-metal emerging from the pot into substantially uniform contact with said mesh and cause cooling of the zinc coating on the sheets to be initiated simultaneously at a plurality of substantially uniformly distributed points on the surface thereof, thereby producing a sheet with a substantially uniformly spangled appearance.

2. A conveyer adapted to receive metal sheets from a galvanizing pot, said conveyer including a pair of spaced driving chains, a belt of flexible mesh between said chains, stretcher bars extending through said mesh and secured to said chains to stiffen the belt transversely and maintain uniform contact thereof with the sheets, and a magnetic pulley adjacent an end of said pot, around which said conveyer is trained, said pulley being effective to attract sheets emerging from the pot into substantially uniform contact with said mesh and cause cooling of the zinc coating on the sheets to be initiated simultaneously at a plurality of substantially uniformly distributed points on the surface thereof, thereby producing a sheet with a substantially uniformly spangled appearance, said pulley being journaled on substantially horizontal arms pivoted at their ends remote from the pulley, whereby the weight of the pulley tensions said chains and belt.

DONALD A. McARTHUR.
JOHN C. HOLDGATE.
CARL KOELKEBECK.